United States Patent
Gilpin et al.

(10) Patent No.: US 8,600,940 B2
(45) Date of Patent: Dec. 3, 2013

(54) CONCURRENTLY BACKING UP DATA FROM MULTIPLE BACKUP SERVERS IN A BACKUP STORAGE TIER

(75) Inventors: Joseph Milton Gilpin, Blaine, MN (US); Claudia Lynne Rudolph, Medina, MN (US)

(73) Assignee: Symantec Operating Corporation, Mountain View, CA (US)

(*) Notice: Subject to any disclaimer, the term of this patent is extended or adjusted under 35 U.S.C. 154(b) by 805 days.

(21) Appl. No.: 11/962,736

(22) Filed: Dec. 21, 2007

(65) Prior Publication Data
US 2009/0164530 A1 Jun. 25, 2009

(51) Int. Cl.
*G06F 12/00* (2006.01)

(52) U.S. Cl.
USPC .......................... 707/640; 707/610; 707/645

(58) Field of Classification Search
USPC .................. 707/201–204, 610, 640, 645
See application file for complete search history.

(56) References Cited

U.S. PATENT DOCUMENTS

| | | | |
|---|---|---|---|
| 6,487,644 B1 | 11/2002 | Huebsch et al. | |
| 6,505,216 B1* | 1/2003 | Schutzman et al. | 707/204 |
| 6,735,636 B1 | 5/2004 | Mokryn et al. | |
| 6,880,051 B2* | 4/2005 | Timpanaro-Perrotta | 711/162 |
| 7,127,535 B1* | 10/2006 | Huebsch et al. | 710/52 |
| 7,197,520 B1 | 3/2007 | Matthews et al. | |
| 7,203,805 B2 | 4/2007 | McNeil et al. | |
| 7,613,747 B1* | 11/2009 | Thakur et al. | 707/204 |
| 7,657,716 B2* | 2/2010 | Kroening | 711/162 |
| 2006/0010227 A1* | 1/2006 | Atluri | 709/217 |
| 2007/0226279 A1* | 9/2007 | Barton et al. | 707/204 |

* cited by examiner

*Primary Examiner* — Apu Mofiz
*Assistant Examiner* — Mohammad Rahman
(74) *Attorney, Agent, or Firm* — Meyertons, Hood, Kivlin, Kowert & Goetzel, P.C.

(57) ABSTRACT

Various embodiments of a system and method for backing up data from a plurality of backup server computers in a first backup storage tier to a backup server computer in a second backup storage tier are disclosed. According to one embodiment of the method, a group of backup data sources may be associated with a writer on the backup server computer. Each backup data source may comprise data to be backed up from one of the backup server computer systems in the first backup storage tier. The writer may keep track of the write speed at which data from the group of backup data sources is written to a target storage device, and the number of backup data sources in the group may be automatically adjusted based on the write speed.

18 Claims, 7 Drawing Sheets

CONCURRENTLY BACKING UP DATA FROM MULTIPLE BACKUP SERVERS IN A BACKUP STORAGE TIER

BACKGROUND OF THE INVENTION

1. Field of the Invention

This invention relates generally to backup data storage. More particularly, the invention relates to a system and method for concurrently backing up data from a plurality of backup server computers in one backup storage tier to a backup server computer in another backup storage tier.

2. Description of the Related Art

Computer systems generally store various types of information, e.g., where the data is stored in files or databases. If a storage device on which the data is stored fails then the data may be lost. Thus, it is often desirable to backup the data stored on a computer system. In particular, some backup systems operate to backup data from a client computer to a backup server computer by transmitting the backup data from the client computer to the backup server computer through a network.

Some systems provide increased protection against data loss by providing multiple levels of backup. For example, data originating from client computers may be backed up to one or more backup server computers in a primary backup storage tier. The data from the backup server computers in the primary backup storage tier may then be backed up to or replicated on another backup server computer in a secondary backup storage tier.

SUMMARY

Various embodiments of a system and method for backing up data from a plurality of backup server computers in a first backup storage tier to a second-tier backup server computer in a second backup storage tier are disclosed. The backup server computers in the first backup storage tier may be coupled to the second-tier backup server computer in the second backup storage tier via a network. Each backup server computer in the first backup storage tier may transmit data to the second-tier backup server computer in the second backup storage tier through the network in order to replicate the data on the second-tier backup server computer in the second backup storage tier.

According to one embodiment of the method, the second-tier backup server computer may be configured to concurrently backup data received from the two or more backup server computers in the first backup storage tier by receiving data from a group of backup data sources, where each backup data source comprises data to be backed up from one of the backup server computers in the first backup storage tier. The second-tier backup server computer may write the data from the group of backup data sources to the storage device and calculate a first rate at which the data from the group of backup data sources is written to the storage device.

The second-tier backup server computer may add a first additional backup data source to the group of backup data sources after calculating the first rate and calculate a second rate at which the data from the group of backup data sources including the first additional backup data source is written to the target storage device. In response to determining that the second rate is faster than the first rate, the second-tier backup server computer may add a second additional backup data source to the group of backup data sources.

In some embodiments the second-tier backup server computer may be further configured to calculate a third rate at which the writer writes the data from the group of backup data sources including the first and second additional backup data sources to the target storage device and determine that another backup data source should not be added to the group of backup data sources in response to determining that the third rate is less than or equal to the second rate.

BRIEF DESCRIPTION OF THE DRAWINGS

A better understanding of the invention can be obtained when the following detailed description is considered in conjunction with the following drawings, in which.

Figure 1:
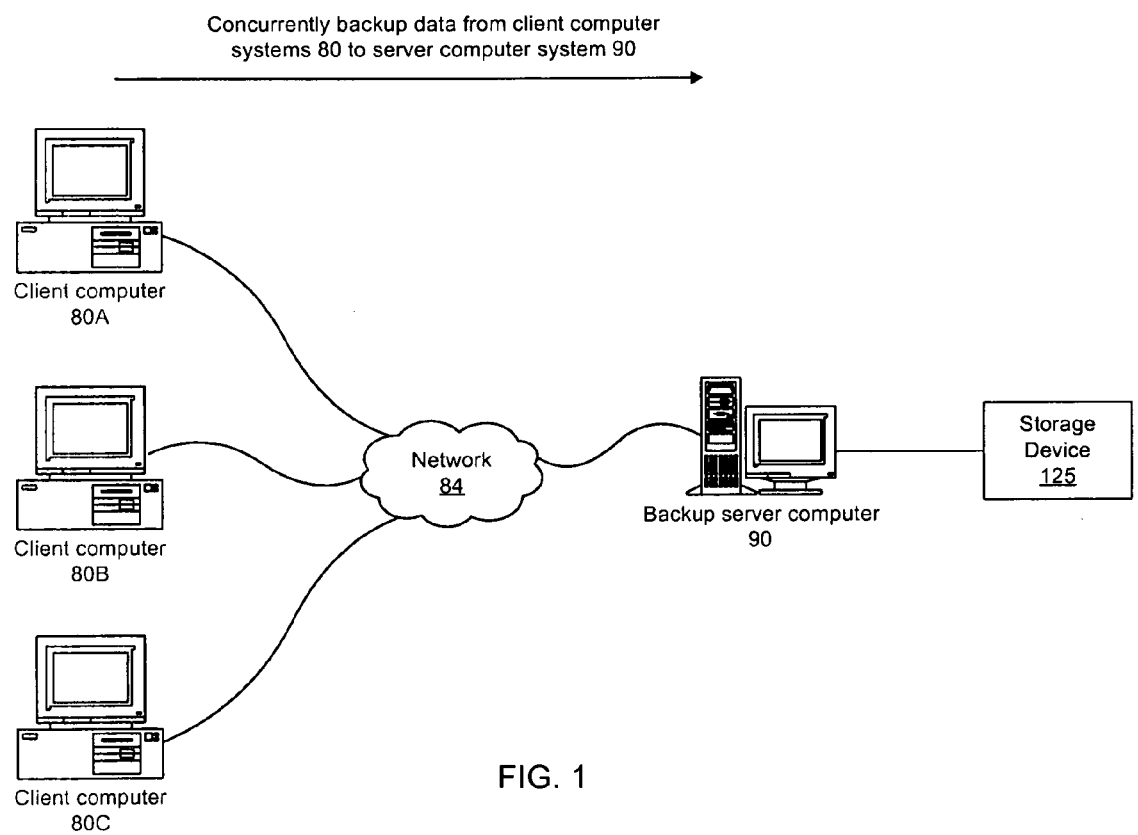
FIG. 1 illustrates one embodiment of a system for backing up data from a plurality of client computers to a backup server computer system.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for backing up data to a backup server computer system are described herein. FIG. 1 illustrates one embodiment of the system. The system includes a plurality of client computers 80. Each client computer 80 may be coupled to a backup server computer 90 via a network 84. Each client computer 80 may transmit data to the backup server computer 90 through the network 84 in order to backup the data to the backup server computer 90 or replicate the data on the backup server computer 90.

The backup server computer 90 may execute backup software that implements a writer module (also referred to as simply a writer). A group of backup data sources may be associated with the writer module, where each backup data source includes data transmitted to the backup server computer 90 from one of the client computers 80. For example, multiple client computers 80 may concurrently transmit data to the backup server computer 90, where each backup data source in the group of backup data sources associated with the writer corresponds to the data received from one of the client computers 80. The writer may write the data from the group of backup data sources to a target storage device 125, e.g., in a multiplexed or interleaved fashion. The writer may also monitor the rate at which it writes the data to the target storage device 125. The backup server computer 90 may be configured to automatically adjust the number of backup data sources in the group of backup data sources associated with the writer based on the write rate. For example, additional backup data sources may be added to the group until a maximum or peak write rate is reached. Once the maximum write rate is reached, the backup server computer 90 may stop adding additional backup data sources to the group.

In some embodiments two or more of the backup data sources in the group associated with the writer may correspond to the same client computer 80. For example, a given client computer 80A may include multiple backup images or datasets, where each backup image or dataset needs to be separately backed up to and stored on the backup server computer 90. For example, the group of backup data sources associated with the writer may include a first backup data source corresponding to a first backup image on the client computer 80A and a second backup data source corresponding to a second backup image on the client computer 80A. Thus, in some embodiments the backup server computer 90 may operate to concurrently receive and backup data from multiple backup data sources on the same client computer 80 (as well as possibly also concurrently receiving and backing up data from one or more other backup data sources on one or more other client computers 80).

In various embodiments, enabling the backup server computer 90 to concurrently receive and backup data from multiple backup data sources on one or more client computers 80 may increase the efficiency of backing up data to the backup server computer 90. For example, suppose that the target storage device 125 on the backup server computer 90 is operable to write data at a rate of 400 MB per second, and suppose that average rate at which data is transmitted from a given client computer 80 to the server computer 90 is 50 MB per second. Enabling the server computer 90 to backup data from multiple client computers 80 at the same time may enable data to be written to the target storage device 125 at or near the maximum write rate of 400 MB per second, whereas data would only be written at an average rate of 50 MB per second if the backup server computer 90 only backed up data from one client computer 80 at a time.

Furthermore, enabling the backup server computer 90 to automatically adjust the number of backup data sources in the group of backup data sources associated with the writer module may enable the number of backup data sources being concurrently backed up at any given time to vary depending upon variable factors such as the current network transmission speed, the speed at which the data is read on the client computer systems 80, etc. Also, since the number of backup data sources being concurrently backed up can be adjusted automatically, a human administrator may not be required to configure a minimum or maximum number of backup data sources which the backup server computer 90 should concurrently backup to the target storage device 125.

In some embodiments the data that each client computer 80 transmits to the backup server computer 90 may originate from the client computer 80 itself. For example, each client computer 80 may belong to a particular end user and may store data such as the end user's application program files, data files, operating system files, etc.

In other embodiments each client computer 80 may itself be a backup server computer with respect to one or more other client computers. For example, in some embodiments each client computer 80 may be a backup server computer in a primary backup storage tier and may be operable to backup data from one or more client computers. In this example, the backup server computer 90 may be a backup server computer in a secondary backup storage tier and may be operable to backup the data from the backup server computers in the primary backup storage tier. Thus, the term "client computer 80" simply means that the computers 80 are clients of the backup server computer 90.

Referring again to FIG. 1, in various embodiments the network 84 may include any type of network or combination of networks. For example, the network 84 may include any type or combination of local area network (LAN), a wide area network (WAN), wireless networks, an Intranet, the Internet, etc. Examples of local area networks include Ethernet networks, Fiber Distributed Data Interface (FDDI) networks, and token ring networks. Also, the client computers 80 and backup server computer 90 may each be coupled to the network 84 using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

Figure 2:
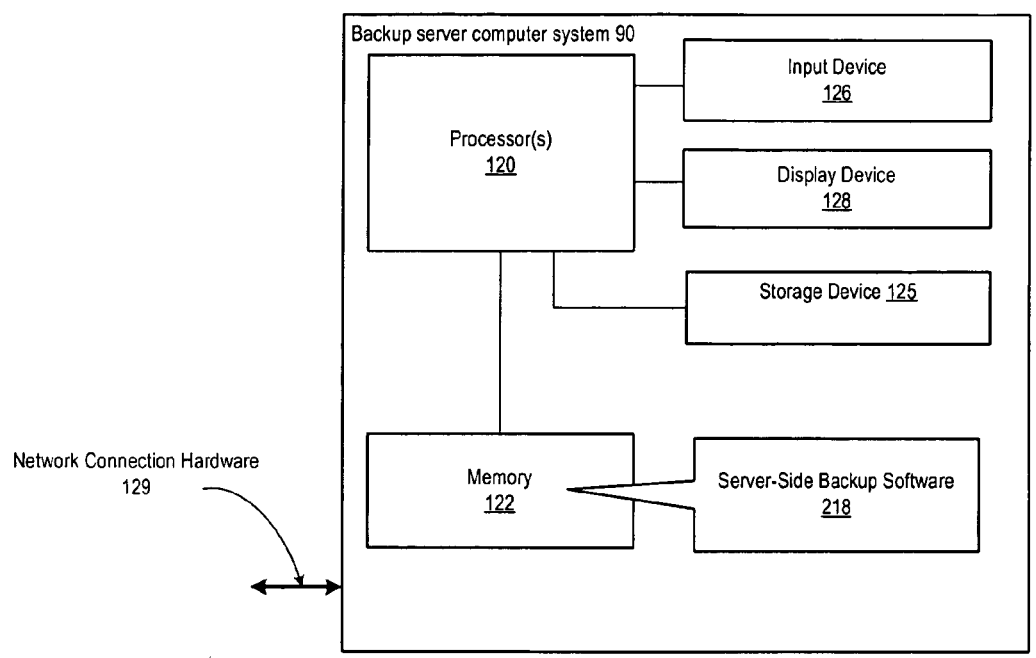
FIG. 2 illustrates an example of the backup server computer system according to one embodiment.

FIG. 2 illustrates an example of the backup server computer system 90 according to one embodiment. In various embodiments the backup server computer system 90 may comprise any type of computer system. In this example, the backup server computer system 90 includes a processor 120 coupled to a memory 122. In some embodiments the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or data. In particular, the memory 122 may store server-side backup software 218. The processor 120 may execute the server-side backup software 218 to backup data from the client computer systems 80 as described herein. The memory 122 may also store other software which operates in conjunction with or which is used by the server-side backup software 218, such as network communication software and operating system software.

It is noted that the processor 120 is representative of any type of processor. For example, in some embodiments, the processor 120 may be compatible with the x86 architecture, while in other embodiments the processor 120 may be compatible with the SPARC™ family of processors. Also, in some embodiments the backup server computer system 90 may include multiple processors 120.

The backup server computer system 90 also includes or is coupled to one or more storage devices 125, e.g., one or more target storage devices to which the data from the client computers 80 is backed up. In various embodiments the target storage device(s) 125 may comprise any of various kinds of storage devices operable to store data. For example, in some embodiments the target storage device(s) 125 may comprise a tape drive. In other embodiments the target storage device(s) 125 may comprise other types of storage devices, such as optical storage devices, disk drives, flash memory devices, etc. As one example, the target storage device(s) 125 may be implemented as one or more disk drives configured independently or as a disk storage system.

In some embodiments the backup server computer system 90 may also include one or more input devices 126 for receiving user input from a user of the backup server computer system 90. The input device(s) 126 may include any of various types of input devices, such as keyboards, keypads, microphones, or pointing devices (e.g., a mouse or trackball). The backup server computer system 90 may also include one or more output devices 128 for displaying output to the user. The output device(s) 128 may include any of various types of output devices or display devices, such as LCD screens or monitors, CRT monitors, etc.

The backup server computer system 90 may also include network connection hardware 129 through which the backup server computer system 90 connects to the network 84. The network connection hardware 129 may include any type of hardware for coupling the backup server computer system 90 to the network 84, e.g., depending on the type of network. As noted above, in various embodiments, the backup server computer system 90 may be coupled to the client computers 80 via any type of network or combination of networks.

Figure 3:
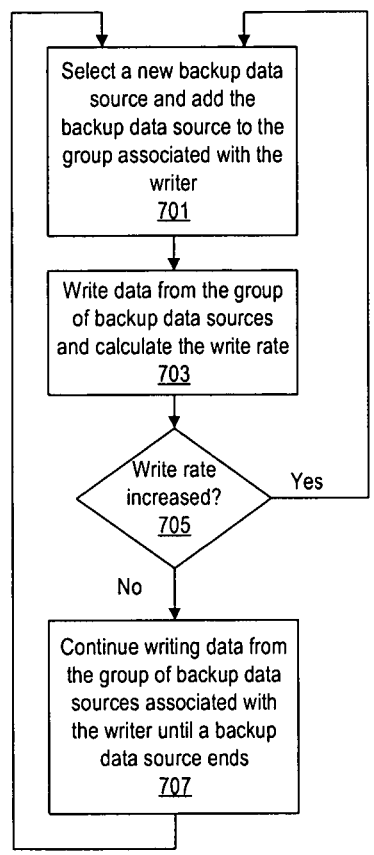
FIG. 3 is a flowchart diagram illustrating operation of server-side backup software according to one embodiment.

FIG. 3 is a flowchart diagram illustrating operation of the server-side backup software 218 according to one embodiment. The server-side backup software 218 may include a writer module (also referred to as simply a writer) that implements one or more processes or threads that execute to write the backup data received from the client computers 80 to the target storage device 125.

As discussed above, a group of backup data sources may be associated with the writer, where the number of backup data sources in the group may be automatically adjusted over time. When the writer first begins the group may be empty, e.g., no backup data sources may be associated with the writer yet. As indicated in block 701, a new backup data source may be selected and added to the group associated with the writer. For example, each client computer 80 may store one or more backup images or datasets that need to be backed up to the backup server computer 90. For each backup image or dataset stored on a respective client computer 80 that is ready to be backed up, the respective client computer 80 may communicate with the server-side backup software 218 to request the server-side backup software 218 to begin backing up the backup image or dataset. Thus, each backup image or dataset which a client computer 80 has requested the server-side backup software 218 to begin backing up is available as a backup data source that can be selected for addition to the group of backup data sources associated with the writer.

Thus, in 701, the server-side backup software 218 may select a particular backup image or dataset which one of the client computers 80 has requested to begin backing up, and the server-side backup software 218 may add the selected backup image or dataset as the new backup data source associated with the writer. The server-side backup software 218 may then begin communicating with the respective client computer 80 from which the data of the new backup data source originates in order to receive the data from the new backup source.

As indicated in block 703, the writer may write the data from the group of backup data sources to the target storage device. In the current example, the group only contains one backup data source so far. The writer may also calculate the rate at which the data from the group of backup data sources is written to the target storage device 125, e.g., by keeping track of the amount of data written to the target storage device 125 per unit time (e.g., the number of megabytes written per second).

As indicated in block 705, if the write rate has increased then blocks 701 and 703 may be repeated. In the current example, the write rate has increased since the writer has just begun to write data. Thus, a second backup data source may be selected and added to the group of backup data sources associated with the writer. After the second backup data source has been added to the group, the writer may write data from both the first backup data source and the second backup data source to the target storage device 125, e.g., in an interleaved or multiplexed fashion.

Adding the second backup data source to the group associated with the writer may cause the rate at which the writer writes data to the target storage device 125 to change. For example, if the data from the first backup data source was being transmitted to the backup server computer 90 at a slower rate than the maximum rate at which the target storage device 125 is capable of writing data then the write rate may increase after the second backup data source is added to the group associated with the writer, since the backup server computer 90 now concurrently receives data from both the first backup data source and the second backup data source, which increases the overall rate at which backup data is transmitted to the backup server computer 90.

Thus, the writer may calculate its current write rate after the second backup data source has been added to the group. If the current write rate is faster than the previously calculated write rate then blocks 701 and 703 may be repeated again. Thus, new backup data sources may continue to be added to the group until the write rate stops increasing. When the write rate has stopped increasing, this may indicate that the maximum write rate of the target storage device 125 has been reached, and thus, the server-side backup software 218 may cease adding new backup data sources to the group associated with the writer.

As indicated in block 707, once the server-side backup software 218 ceases adding new backup data sources to the group, the writer may continue writing the data from the backup data sources already in the group to the target storage device 125 until one of the backup data sources ends, e.g., until all the data of the backup image or dataset for the backup data source has been written to the target storage device 125.

In response to one of the backup data sources ending, the server-side backup software 218 may select another pending backup data source to add to the group associated with the writer, and operation may proceed similarly as described above, as indicated by the arrow returning from block 707 to block 701.

Thus, in some embodiments, after the writer determines that the write rate has stopped increasing, the server-side backup software 218 may continue to allow all of the backup data sources already added to the group to remain in the group. In other embodiments, if the writer determines that adding a new backup data source to the group caused the write rate to decrease then the most recently added backup data source may be removed from the group. Removing the most recently added backup data source from the group may enable the write rate to increase.

In some embodiments, in determining whether the write rate increased in block 705, the server-side backup software 218 may determine whether the write rate increased by at least a threshold amount. If the write rate increased but increased less than the threshold amount than the server-side backup software 218 may cease adding new backup data sources to the group. For example, if the write rate does not increase by at least a small threshold amount, this may indicate that the write rate is already near the maximum rate at which the target storage device is capable of writing data. In various embodiments the threshold amount may be set to any desired amount.

In other embodiments, even after the server-side backup software 218 determines that the write rate did not increase after a new backup data source was added to the group, the server-side backup software 218 may still add one or more new backup data sources to the group. For example, the server-side backup software 218 may add another backup data source to the group and then check again to see whether the write rate has increased. If so then the server-side backup software 218 may resume adding backup data sources to the group, as described above. Otherwise, the server-side backup software 218 may cease adding any more backup data sources to the group until a backup data source completes.

In some embodiments the server-side backup software 218 may enforce a minimum time interval between the time at which a new backup data source is added to the group associated with the writer and the time at which the new write rate is calculated. When a backup data source is first added to the group there may be some setup overhead involved in establishing communication with the respective client computer 80 and streaming the data from the client computer 80 to the backup server computer 90. Enforcing a minimum time interval to lapse between the time a new backup data source is added to the group and the time at which the new write rate is calculated may enable the network communication between the client computer 80 and the backup server computer 90 to settle into a relatively steady state so that an accurate write rate can be calculated.

Figure 4:
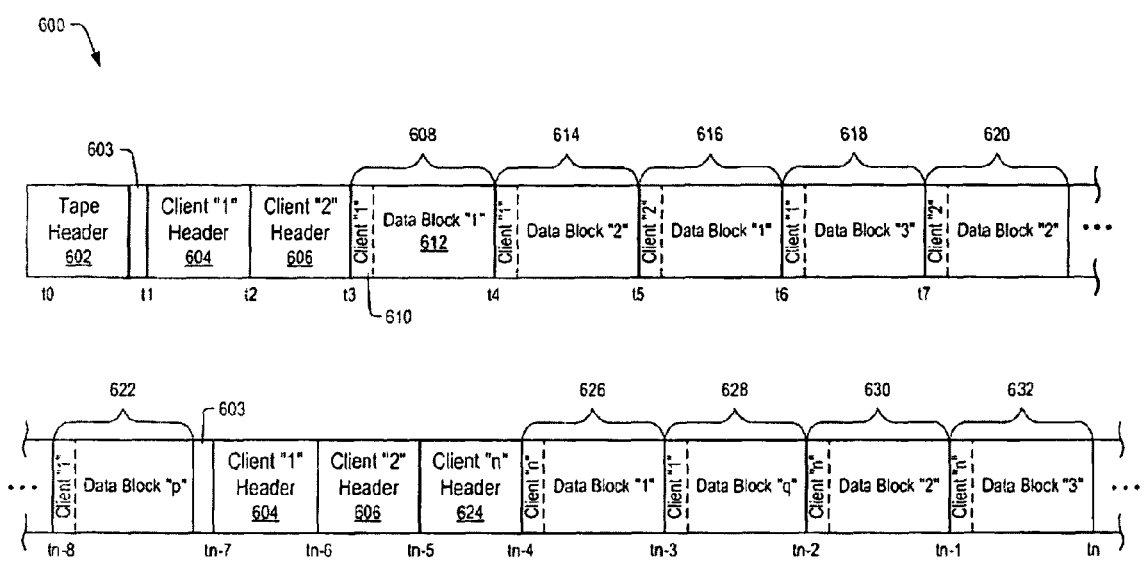
FIG. 4 is a block diagram of a data format for multiplexing backup data to tape.

As described above, in some embodiments the backup server computer 90 may write data from the group of backup data sources in a multiplexed or interleaved manner to a tape drive. FIG. 4 is a block diagram of a data format 600 for multiplexing backup data to tape. The data format 600 includes a tape header 602, a tape mark 603, client (back-up) headers 604, 606, 624 and multiplexed data entries 608, 614, 616, 618, 620, 622, 626, 628, 630, 632. Each multiplexed data entry (e.g., 608) includes a client ID tag 610 and a data block 612. In the example tape shown in FIG. 4, from time $t_0$ through $t_{n-7}$, only back-up data from the client "1" (e.g., client computer 80A) and the client "2" (e.g., client computer 80B) were being received and multiplexed to tape. Of that data, the client "1" computer had several back-up data entries 608, 614, 618, 622 written to the tape, and the client "2" computer had several back-up data entries 616, 620 written to tape. Then at time $t_{n-7}$, client "n" (e.g., client computer 80C) started to backup its data to tape. As a result, the tape mark 603 and client back-up headers 604, 606, 624 were written to tape. Subsequently, the client "n" computer stored three back-up data entries 626, 630, 632 to tape, while client "1" computer stored back-up data entry 628. The client headers written to the tape may be used to identify which portions of backup data on the tape correspond to which client computers 80, e.g., in the event that the backup data for a particular client computer 80 needs to subsequently be read from the tape.

Figure 5:
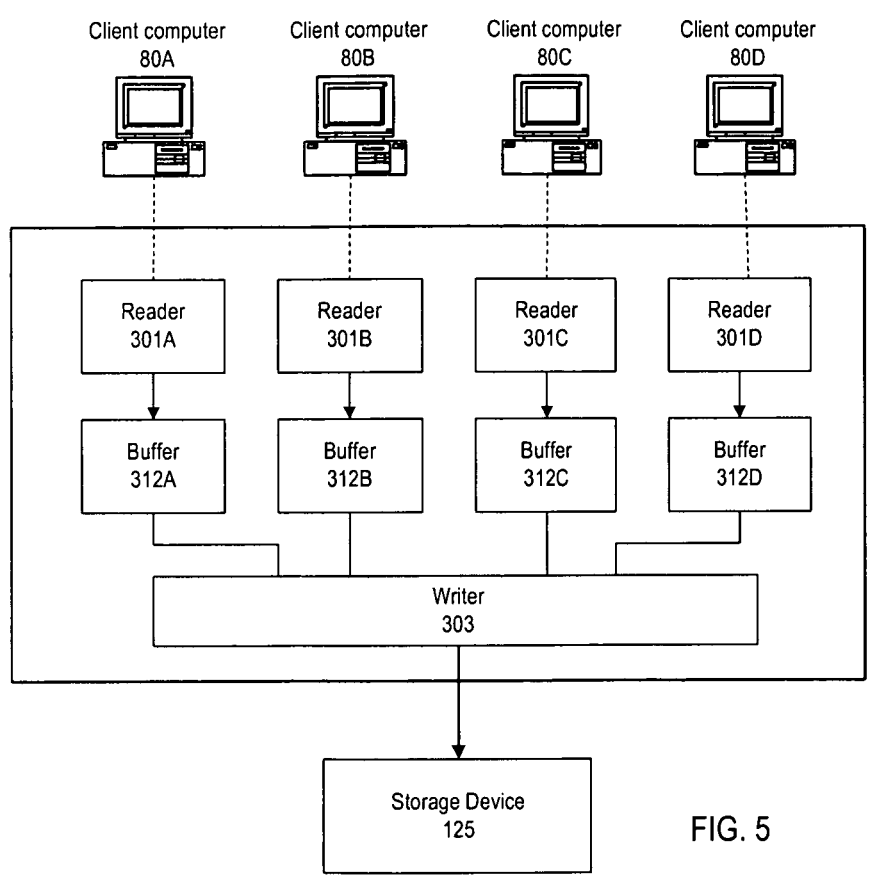
FIG. 5 illustrates operation of the server-side backup software according to one embodiment.

In various embodiments the server-side backup software 218 may be implemented in any of various ways and may have any desired software architecture. FIG. 5 illustrates operation of the server-side backup software 218 according to one embodiment. As shown, the server-side backup software 218 includes a writer module 303 such as described above, e.g., where the writer module 303 implements one or more threads or process that write data from a group of backup data sources to a target storage device 125. In this example, the group includes four backup data sources on four client computers 80A-80D. For each backup data source in the group, the server-side backup software 218 has instantiated a corresponding reader module 301. For example, the reader 301A may execute to receive the backup data transmitted over the network 84 from the client computer 80A. Similarly, the readers 301B-D execute to receive the backup data transmitted from the client computers 80B-80D, respectively.

As shown, each reader 301 may store the data received from the respective client computer 80 in a buffer 312, e.g., where the buffer 312 for each reader 301 is implemented as a portion of the memory 122 of the backup server computer 90. The writer 303 may select a first buffer 312, e.g., the buffer 312A. The writer 303 may read the data stored in the buffer 312A, and write the data to the target storage device 125.

When all the data in the buffer 312A has been read and written to the target storage device 125, the writer may then select another buffer 312, e.g., the buffer 312B, read the data from the buffer 312B, and write the data to the target storage device 125. Thus, the writer 303 may continue to select buffers 312 and write their contents to the storage device 125. In the meantime, while data from other buffers are being written to the storage device 125, readers 301 whose buffers have already been written to the storage device 125 may communicate with their respective client computers 80 to receive additional data and store the additional data in the respective buffers to replenish the buffers that have already been read by the writer 303. Thus, after reading and writing the contents of a particular buffer 312A to the storage device 125, the writer may then read and write the contents of other buffers 312 to the storage device 125, and may subsequently return to the buffer 312A to read and write its replenished contents to the storage device 125. In this manner, the writer 303 may alternate between the buffers 312 to write the data from the respective backup data sources to the storage device 125 in an alternating or multiplexed fashion.

Thus, the readers 301 may operate concurrently with each other to receive data from each backup data source in the group of backup data sources associated with the writer, and the writer may operate to multiplex the data from the group of backup data sources to the target storage device 125. Thus, the data from each backup data source in the group of backup data sources associated with the writer may be concurrently backed up to the target storage device 125.

When each backup image or dataset on the client computers 80 is scheduled or ready to be backed up to the backup server computer 90, the client computer 80 may communicate with the server-side backup software 218 to request the server-side backup software 218 to begin backing up the backup image or dataset. A backup image or dataset may comprise one or more files which need to be backed up to the backed server computer 90 and stored in association with each other, e.g., such that the one or more files are grouped together and identified as a single backup.

Thus, when the server-side backup software 218 selects a new backup data source to add to the group associated with the writer, the server-side backup software 218 may be operable to select any particular backup image or dataset which a client computer 80 has requested to be backed up. In various embodiments, the server-side backup software 218 may be operable to select a new backup data source to add to the group associated with the writer based on any of various criteria. For example, in some embodiments the backup images or datasets may be added to the group as new backup data sources on a first-come, first-served basis.

Figure 6:
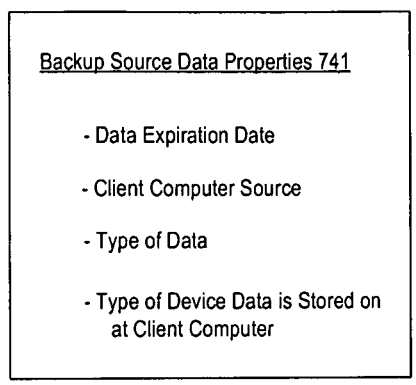
FIG. 6 illustrates several examples of properties 741 of backup data sources.

In other embodiments the server-side backup software 218 may select a given backup image or dataset as a backup data source to be added to the group based on one or more properties of the given backup image or dataset. FIG. 6 illustrates several examples of properties 741 of backup data sources.

For example, in some embodiments the backup image may have an associated expiration date, e.g., where the expiration date indicates a time at which the backup image expires, or indicates how long the backup image is desired to be stored or expected to be stored. In some embodiments it may be desirable to group together backup images on the target storage device 125 of the server computer 90 based on similarities in their expiration dates. For example, in an embodiment in which the backup images are written to a tape in an interleaved manner, all of the backup images on the tape may expire at the same time or closely in time with respect to each other so that the tape can be erased or rewritten when they expire.

As another example, the server-side backup software 218 may select a particular backup image based on the client computer 80 from which the backup image originates. For example, if the group of backup data sources associated with the writer already includes a backup image from a particular client computer 80A and another backup image from the same client computer 80A is pending then the pending backup image may be selected as a new backup data source to be added to the group. This may enable backup images from the same client computers 80 to be written together with each other to the target storage device 125.

In other embodiments, the server-side backup software 218 may avoid selecting a particular backup image on a particular client computer 80 if the group of backup data sources associated with the writer already includes another backup image from the particular client computer 80. In some embodiments, adding the second backup image from the particular client computer 80 may cause the rate at which data is transmitted to the backup server computer 90 from the particular client computer 80 to decrease, e.g., if the particular client computer 80 begins to experience disk thrashes when reading from both backup images. Thus, in some embodiments, when selecting a new backup data source to add to the group, the server-side backup software 218 may give preference to backup data sources on client computers 80 that are not currently transmitting other backup data to the backup server computer 90.

As another example, the server-side backup software 218 may select a particular backup image based on the type of data the backup image contains. For example, there may be different types of backup images, such as filesystem backups, database backups, etc. Thus, in some embodiments the server-side backup software 218 may be operable to group backup images together based on the type of data.

As another example, each backup image may have an associated priority that indicates the importance of the data, or each backup image may be stored on a type or class of storage device on the client computers 80, where the type or class of storage device indicates the importance of the data. Thus, in some embodiments the server-side backup software 218 may be operable to group backup images together based on the importance of the data.

Figure 7:
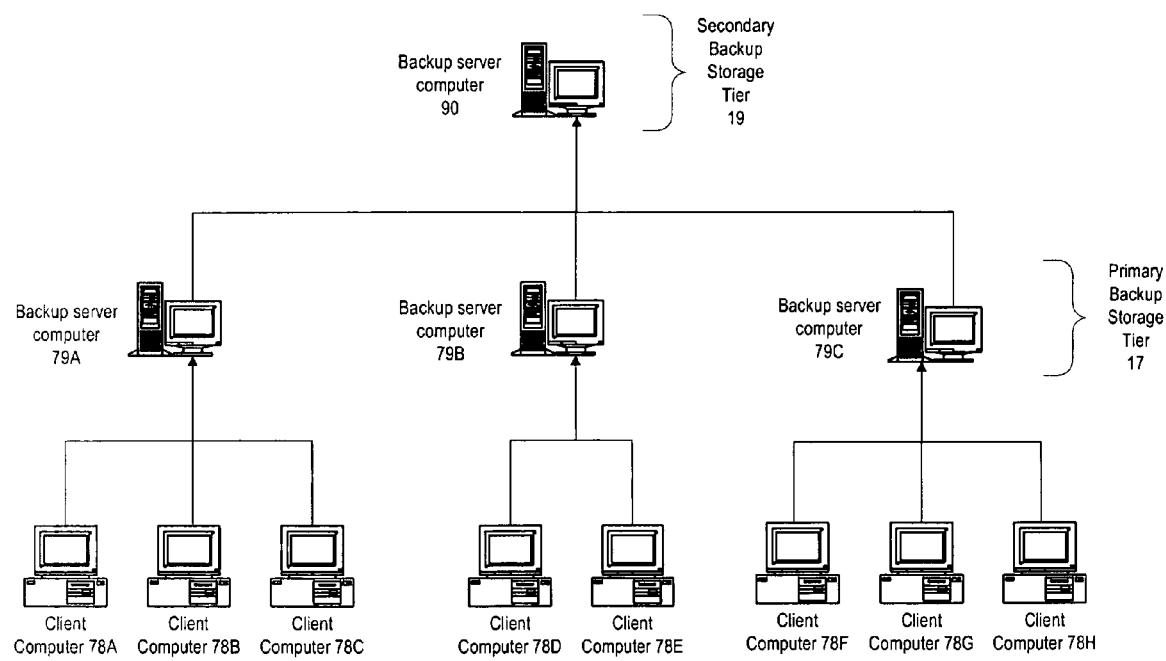
FIG. 7 illustrates an example where the backup server computer is included in a secondary backup storage tier.

As discussed above, in some embodiments the client computers 80 may themselves be server computers with respect to other client computers. FIG. 7 illustrates an example of a system including a primary backup storage tier 17. The primary backup storage tier 17 includes three backup server computers 79A-C. A respective set of client computers 78 is associated with each backup server computer 79. For example, the backup server computer 79A is operable to receive data from the three client computers 78A-C and backup the data. Similarly, the backup server computer 79B receives and backs up data from the client computers 78D-E, and the backup server computer 79C receives and backs up data from the client computers 78F-H.

The system of FIG. 7 also includes a secondary backup storage tier 19 including the backup server computer 90. In this example, the clients of the backup server computer 90 are the backup server computers 79 in the primary backup storage tier 17. Thus, the backup server computers 79 may correspond to the client computers 80 discussed above.

For example, the backup server computer 79A may communicate with the backup server computer 90 to replicate the data backed up from the client computers 78A-C onto the backup server computer 90. Similarly, the backup server computers 79B and 79C may communicate with the backup server computer 90 to replicate the data backed up from the client computers 78D-E and the client computers 78F-H, respectively. The backup server computer 90 may concurrently receive and backup data from backup data sources on multiple ones of the backup server computers 79 and/or may concurrently receive and backup data from multiple backup data sources on a given one of the backup server computers 79. The server-side backup software 218 on the backup server computer 90 may automatically adjust the number of backup data sources being concurrently backed up to the backup server computer 90, similarly as described above.

Thus, FIG. 7 illustrates an example in which backup operations are performed in a hierarchical manner. Each backup storage tier may include one or more backup servers and may represent a level in a hierarchy. Backup servers in a backup storage tier at a lower level in the hierarchy may replicate or backup data to one or more backup data servers in another backup storage tier at a higher level in the hierarchy.

Although the example of FIG. 7 illustrates the concurrent replication of multiple backup images from multiple backup server computers in a primary backup storage tier to a backup server computer 90 in a secondary backup storage tier, it is noted that similar techniques may be applied in other systems. For example, similar techniques may be used to perform multiple concurrent backups from a plurality of backup server computers in any backup storage tier to a backup server computer 90 in any other backup storage tier. For example, in another embodiment the backup server computer 90 may be located in a tertiary backup storage tier and may concurrently backup a plurality of backup images from multiple backup server computers in a secondary backup storage tier.

It is noted that various embodiments may further include receiving, sending or storing instructions and/or data implemented in accordance with the foregoing description upon a computer-accessible storage medium. Generally speaking, a computer-accessible storage medium may include any storage media accessible by a computer during use to provide instructions and/or data to the computer. For example, a computer-accessible storage medium may include storage media such as magnetic or optical media, e.g., disk (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. A system comprising:
a first backup storage tier comprising a first backup server computer; and
a second backup storage tier comprising a plurality of backup server computers, wherein each backup server computer in the second backup storage tier is configured to store files backed up from one or more client comput- ers and to transmit the files to the first backup server computer for further storage;

wherein the first backup server computer in the first backup storage tier is configured to:

determine a group of backup data sources comprising two or more of the plurality of backup server computers in the second backup storage tier;

concurrently backup data from each backup server computer of the group of backup data sources to a single storage device;

calculate a first backup rate at which the data from the group of backup data sources is backed up to the single storage device;

after said calculating the first backup rate, add a first additional backup server computer to the group of backup data sources;

after said adding the first additional backup server computer, calculate a second backup rate at which data from the group of backup data sources is backed up to the single storage device;

calculate a difference between the second backup rate and the first backup rate; and based on the difference between the second backup rate and the first backup rate, automatically modify a number of backup server computers in the group of backup data sources by either adding one or more backup server computers to the group of backup data sources or removing one or more backup server computers from the group of backup data sources.

2. The system of claim 1, wherein the first backup server computer is further configured to:

add a second additional backup server computer to the group of backup data sources in response to determining that the second backup rate is faster than the first backup rate.

3. The system of claim 2, wherein the first backup server computer is further configured to:

after said adding the second additional backup server computer to the group of backup data sources, calculate a third backup rate at which data received from the group of backup data sources including the first and second additional backup server computers is backed up to the single storage device; and determine that another backup server computer should not be added to the group of backup data sources in response to determining that the third backup rate is less than or equal to the second backup rate.

4. The system of claim 2, wherein the first backup server computer is further configured to:

after said adding the second additional backup server computer to the group of backup data sources, calculate a third backup rate at which data received from the group of backup data sources including the first and second additional backup server computers is backed up to the single storage device; and remove the second additional backup server computer from the group of backup data sources in response to determining that the third backup rate is less than the second backup rate.

5. The system of claim 2, wherein the data backed up from the group of backup data sources including the first additional backup server computer includes data from a first set of files stored on the first additional backup server computer, wherein the first backup server computer is configured to select the first additional backup server computer to be added to the group of backup data sources based on one or more properties of the first set of files.

6. The system of claim 5, wherein the first set of files has an expiration date;

wherein selecting the first set of files based on the one or more properties of the first set of files comprises selecting the first set of files based on the expiration date.

7. The system of claim 5, wherein the first set of files includes data of a particular type;

wherein selecting the first set of files based on the one or more properties of the first set of files comprises selecting the first set of files based on the particular type.

8. The system of claim 5, wherein the first set of files is stored on a particular type of storage device on the first additional backup server computer in the second backup storage tier;

wherein selecting the first set of files based on the one or more properties of the first set of files comprises selecting the first set of files based on the particular type of storage device.

9. The system of claim 1, wherein concurrently backing up the data from each backup server computer of the group of backup data sources to the single storage device comprises multiplexing data from different backup server computers to the single storage device.

10. The system of claim 1, wherein concurrently backing up the data from each backup server computer of the group of backup data sources to the single storage device comprises interleaving data from each backup server computer of the group of backup data sources to the single storage device.

11. The system of claim 1, wherein the storage device comprises a tape drive;

wherein concurrently backing up the data from each backup server computer of the group of backup data sources to the storage device comprises writing the data to a tape such that data from different backup server computers is interleaved on the tape.

12. The system of claim 1, wherein the first backup server computer is configured to remove the first additional backup server computer from the group of backup data sources in response to determining that the second backup rate is slower than the first backup rate.

13. A method comprising:

a first backup server computer in a first backup storage tier determining a group of backup data sources comprising two or more of a plurality of backup server computers in a second backup storage tier, wherein each of the backup server computers in the second backup storage tier is configured to store files backed up from one or more client computers and to transmit the files to the first backup server computer for further storage;

the first backup server computer in the first backup storage tier concurrently backing up data from each backup server computer of the group of backup data sources to a single storage device;

the first backup server computer in the first backup storage tier calculating a first backup rate at which the data from the group of backup data sources is backed up to the single storage device;

after said calculating the first backup rate, the first backup server computer in the first backup storage tier adding a first additional backup server computer to the group of backup data sources;

after said adding the first additional backup server computer, the first backup server computer in the first backup storage tier calculating a second backup rate at which data from the group of backup data sources is backed up to the single storage device;

the first backup server computer in the first backup storage tier calculating a difference between the second backup rate and the first backup rate; and based on the difference between the second backup rate and the first backup rate, the first backup server computer in the first backup storage tier automatically modifying a number of backup server computers in the group of backup data sources by either adding one or more backup server computers to the group of backup data sources or removing one or more backup server computers from the group of backup data sources.

14. The method of claim 13, further comprising:
the first backup server computer in the first backup storage tier adding a second additional backup server computer to the group of backup data sources in response to determining that the second backup rate is faster than the first backup rate.

15. The method of claim 13, further comprising:
the first backup server computer in the first backup storage tier removing the first additional backup server computer from the group of backup data sources in response to determining that the second backup rate is slower than the first backup rate.

16. A tangible computer-accessible storage medium storing program instructions executable by a first backup server computer in a first backup storage tier to:
determine a group of backup data sources comprising two or more of a plurality of backup server computers in a second backup storage tier, wherein each of the backup server computers in the second backup storage tier is configured to store files backed up from one or more client computers and to transmit the files to the first backup server computer for further storage;

concurrently backup data from each backup server computer of the group of backup data sources to a single storage device;

calculate a first backup rate at which the data from the group of backup data sources is backed up to the single storage device;

after said calculating the first backup rate, add a first additional backup server computer to the group of backup data sources;

after said adding the first additional backup server computer, calculate a second backup rate at which data from the group of backup data sources is backed up to the single storage device;

calculate a difference between the second backup rate and the first backup rate; and based on the difference between the second backup rate and the first backup rate, automatically modify a number of backup server computers in the group of backup data sources by either adding one or more backup server computers to the group of backup data sources or removing one or more backup server computers from the group of backup data sources.

17. The tangible computer-accessible storage medium of claim 16,
wherein the program instructions are further executable by the first backup server computer to:
add a second additional backup server computer to the group of backup data sources in response to determining that the second backup rate is faster than the first backup rate.

18. The tangible computer-accessible storage medium of claim 16, wherein the program instructions are further executable by the first backup server computer to remove the first additional backup server computer from the group of backup data sources in response to determining that the second backup rate is slower than the first backup rate.

* * * * *